US009692768B1

(12) United States Patent
Kayyoor et al.

(10) Patent No.: US 9,692,768 B1
(45) Date of Patent: Jun. 27, 2017

(54) SHARING CONFIDENTIAL GRAPH DATA USING MULTI-LEVEL GRAPH SUMMARIZATION WITH VARYING DATA UTILITY AND PRIVACY PROTECTION

(71) Applicant: Symantec Corporation, Mountain View, CA (US)

(72) Inventors: Ashwin Kumar Kayyoor, Culver City, CA (US); Susanta K Nanda, Santa Clara, CA (US); Petros Efstathopoulos, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 47 days.

(21) Appl. No.: 14/789,933

(22) Filed: Jul. 1, 2015

(51) Int. Cl.
*H04L 29/06* (2006.01)
*G06F 17/30* (2006.01)

(52) U.S. Cl.
CPC ...... *H04L 63/105* (2013.01); *G06F 17/30719* (2013.01); *G06F 17/30958* (2013.01); *H04L 63/0414* (2013.01); *H04L 63/0421* (2013.01)

(58) Field of Classification Search
None
See application file for complete search history.

(56) References Cited

U.S. PATENT DOCUMENTS 6,952,208 B1 *  10/2005  Arquie ................. G06T 11/206
                                                          345/440
8,126,926 B2     2/2012   Atre et al.
2009/0303237 A1 * 12/2009  Liu ..................... H04L 63/0414
                                                          345/440
2014/0143281 A1 *  5/2014  Duan ................. G06F 17/30292
                                                          707/798
2014/0214834 A1 *  7/2014  Ozonat ............. G06F 17/30958
                                                          707/737
2015/0278919 A1 * 10/2015  Stoll .................. G06Q 30/0631
                                                          705/26.7

(Continued)

OTHER PUBLICATIONS

"Anonymizing Social Networks." M. Hay, G. Miklau, D. Jensen, P. Weis, and S. Srivastava. University of Massachusetts Amherst, Technical Report No. 07-19, 2007 (18 pages).

(Continued)

*Primary Examiner* — Hadi Armouche
*Assistant Examiner* — Andrew Steinle
(74) *Attorney, Agent, or Firm* — Patent Law Works LLP

(57) ABSTRACT

A first graph comprises multiple nodes and edges. At least one successive summary graph is created, using the original graph as a predecessor. To create a second graph from a first, nodes of the first graph are grouped into a plurality of subsets, and each subset becomes a super-node. For each super-node, the edges of each corresponding node are replaced with one or more super-edges. Each super-edge represents a relationship between a pair of super-nodes. The nodes of the successor graph comprise the super-nodes and the edges of the successor graph comprise the super-edges. The steps are tracked for restoring each omitted edge of each predecessor graph. Based on a determined quantified value for the restoration of each omitted edge of each predecessor graph, customized summary graphs can be created for and presented to specific parties. Determined values can be, for example, monetary or based on trust levels.

20 Claims, 4 Drawing Sheets

(56) References Cited

U.S. PATENT DOCUMENTS

2015/0347149 A1* 12/2015 Galati .................... G06F 17/11
                                                                712/201
2016/0071233 A1*  3/2016 Macko ................... G06F 17/10
                                                                345/440

OTHER PUBLICATIONS

"Comparisons of Randomization and k-degree Anonymization Schemes for Privacy Preserving Social Network Publishing." X. Ying, K. Pan, X. Wu, and L. Guo. Proc. of the $3^{rd}$ Workshop on Social Graph Mining and Analysis, New York, USA: ACM, pp. 10:1-10, 2009 (10 pages).

"Edge Anonymity in Social Network Graphs." L. Zhang and W. Zhang. Proc. of the 2009 International Conf. on Computational Science and Engineering—vol. 04: IEEE Computer Society, pp. 1-8, 2009 (8 pages).

* cited by examiner

SHARING CONFIDENTIAL GRAPH DATA USING MULTI-LEVEL GRAPH SUMMARIZATION WITH VARYING DATA UTILITY AND PRIVACY PROTECTION

TECHNICAL FIELD

This disclosure pertains generally to computer security, and more specifically to sharing confidential graph data using multi-level graph summarization with varying data utility and privacy protection.

BACKGROUND

One way of representing data is with a graph, in which content is represented as a finite set of nodes, with the relationship between nodes being represented as edges (graph edges are sometimes referred to as "links" or "arcs"). An edge represents a relationship between a pair of nodes. For example, assuming two nodes x and y, edge (x,y) is said to point or go from x to y. Nodes can have multiple edges pointing to multiple other nodes in the graph. Edges can be used to represent any type of relationship between nodes (e.g., hierarchical, quantified, etc.). Edges can be assigned values quantifying and/or otherwise delineating relationships between corresponding nodes. For example, numerical edge values can quantify relationships such as cost, distance, time, etc. Symbolic labels can express relationships such as hierarchies, dependencies, orderings, etc.

It is often desirable to share graph data between organizations or departments. Such data is often confidential or sensitive, and it thus important to preserve the privacy of data that is being shared. Furthermore, the levels of trust and the economic relationships between different data sharing entities vary, and thus the desired level of privacy to be preserved when sharing graph data varies as well. The edges of a graph often reveal sensitive, confidential information concerning the relationships between the nodes. The most useful (and most private) aspect of the data can be in the form of the edges. It would be desirable to be able to share graph data in a manner that preserves its privacy, yet still maintains its utility.

Previous efforts to anonymize graph data in this capacity include deletion of node attributes (content) and random edge deletions. Both of these methods drastically decrease the overall utility of the graph data, without clearly preserving privacy. Removing node attributes and sharing the graph topology or structure is vulnerable to privacy breach because if any particular subgraph is discovered with known information, the whole graph can be inferred with all attributes. With random edge deletion, the most sensitive edges can still be revealed. Also, these approaches do not enable sharing of graph data with varied levels of utility and privacy preservation.

It would be desirable to address these issues.

SUMMARY

Confidential graph data is shared by creating multiple levels of summary graphs, with varying data utility and privacy protection. A first, original graph comprises a plurality of nodes and a plurality of edges. Each node comprises content and each edge represents a relationship between a pair of nodes. Some (or all) of the edges represent confidential data. At least one successive summary graph is created, using the original graph as a predecessor. To create a second graph from a first, nodes of the first graph are grouped into a plurality of subsets. This grouping can be based on logical proximity of the nodes. In some embodiments, nodes are weighted according to the confidentiality and/or the utility of their content. In some embodiments, edges between nodes are weighted according to the confidentiality and/or the utility of the relationships represented by the edges. In these embodiments, nodes can be grouped based on their weights and/or the weights of their edges. Each grouped subset of nodes is combined into a super-node comprising the content of each node of the subset.

For each specific super-node, the edges of each node that was combined into the super-node are replaced with one or more super-edges. Each super-edge represents a relationship between a pair of super-nodes. Replacing edges of nodes being combined into a super-node with a super-edge can comprise eliminating one or more edges that express a relationship between two nodes being combined into a single super-node. Another example is that one or more edges that express a relationship between a first node being combined into a first super-node and a second node being combined into a second super-node are replaced with a super-edge expressing a relationship between the first super-node and the second super-node. Yet another example is that multiple edges that express separate relationships between at least one node being combined into a first super-node and at least one node being combined into a second super-node are replaced with a single super-edge expressing a relationship between the first super-node and the second super-node.

The nodes of the successor graph comprise the created super-nodes and the edges of the successor graph comprise the created super-edges. One or more edges of the predecessor graph are omitted from the successor graph, and thus the successor graphs lacks confidential data represented by the omitted edge(s). As a successive graph is created, steps for restoring each edge of the predecessor graph omitted from the successor graph are tracked. A quantified value for restoration of each omitted edge is determined. Such a value can be monetary (e.g., in dollars) or can be based on a trust level.

In some embodiments, these steps are used to create a plurality of successive summary graphs from a plurality of predecessor graphs, and the steps are tracked for restoring each omitted edge of each predecessor graph. For example, as multiple recursive passes of graph summarization are made, sets of steps can be tracked and maintained for restoring omitted graph data represented by edges eliminated during multiple generations of graph consolidation.

Based on the determined quantified value for the restoration of each omitted edge of each predecessor graph, customized summary graphs can be created for and presented to specific parties. For example, where determined values are monetary, a custom summary graph can be created by making restorations of omitted edges corresponding to a monetary payment received from the party to whom the custom graph is provided. Where values are in the form of quantified trust levels, a custom summary graph can be created by making restorations of omitted edges corresponding to a trust level of the specific party to whom the graph is presented.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
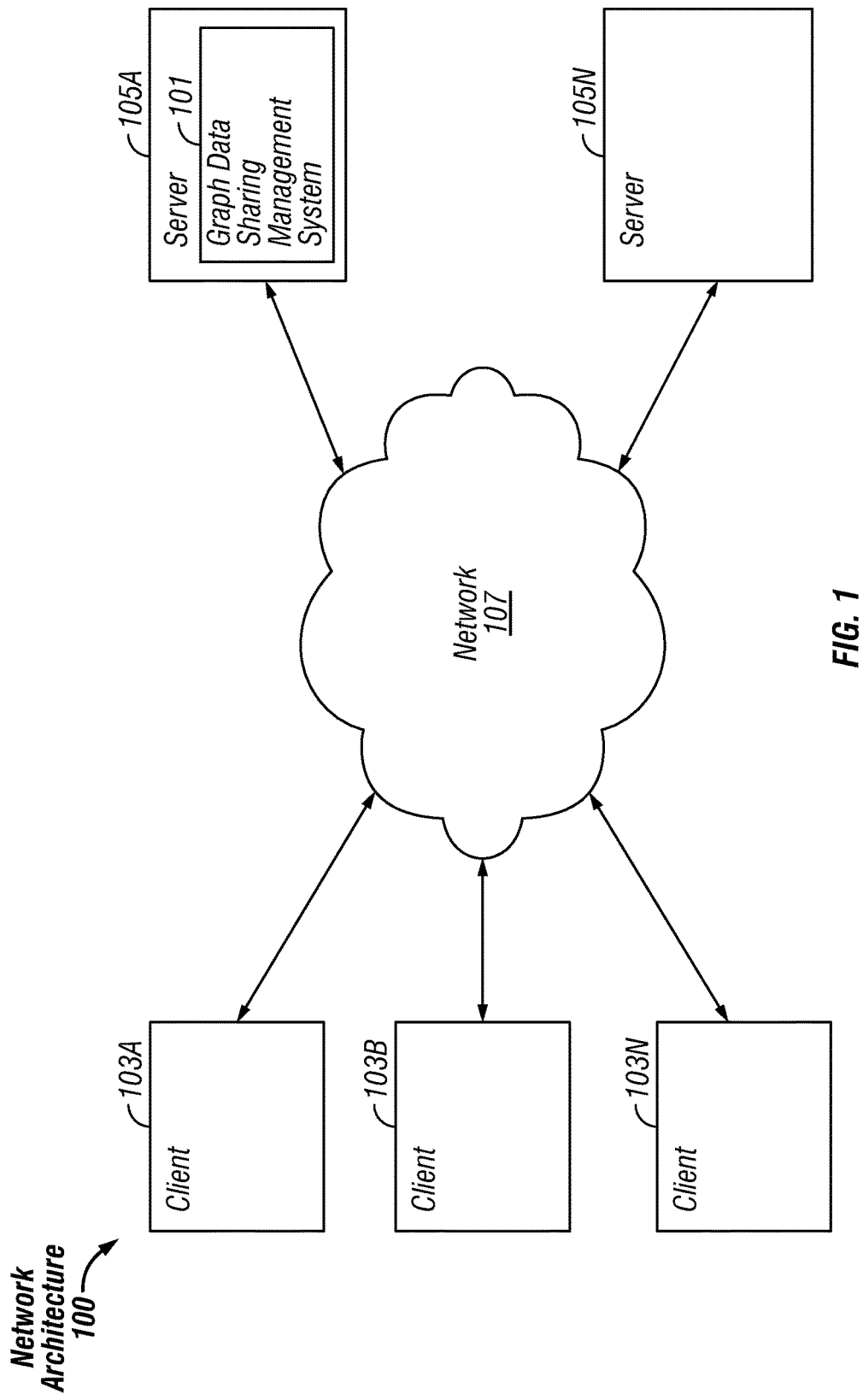
FIG. 1 is a block diagram of an exemplary network architecture in which a graph data sharing management system can be implemented, according to some embodiments.

FIG. 1 is a block diagram illustrating an exemplary network architecture 100 in which a graph data sharing management system 101 can be implemented. The illustrated network architecture 100 comprises multiple clients 103A, 103B and 103N, as well as multiple servers 105A and 105N. In FIG. 1, the graph data sharing management system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
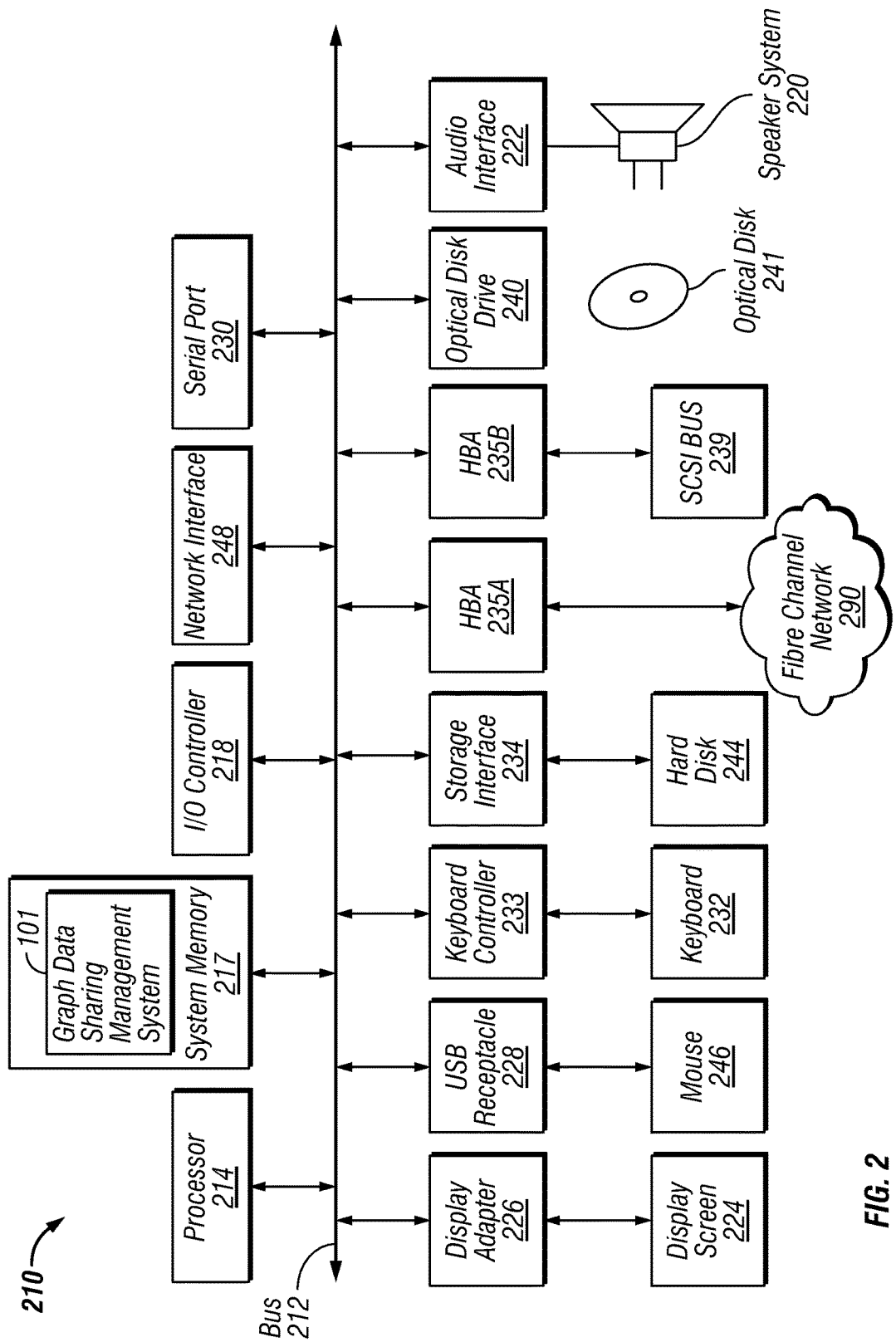
FIG. 2 is a block diagram of a computer system suitable for implementing a graph data sharing management system, according to some embodiments.

FIG. 2 is a block diagram of a computer system 210 suitable for implementing a graph data sharing management system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the graph data sharing management system 101 is illustrated as residing in system memory 217. The workings of the graph data sharing management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
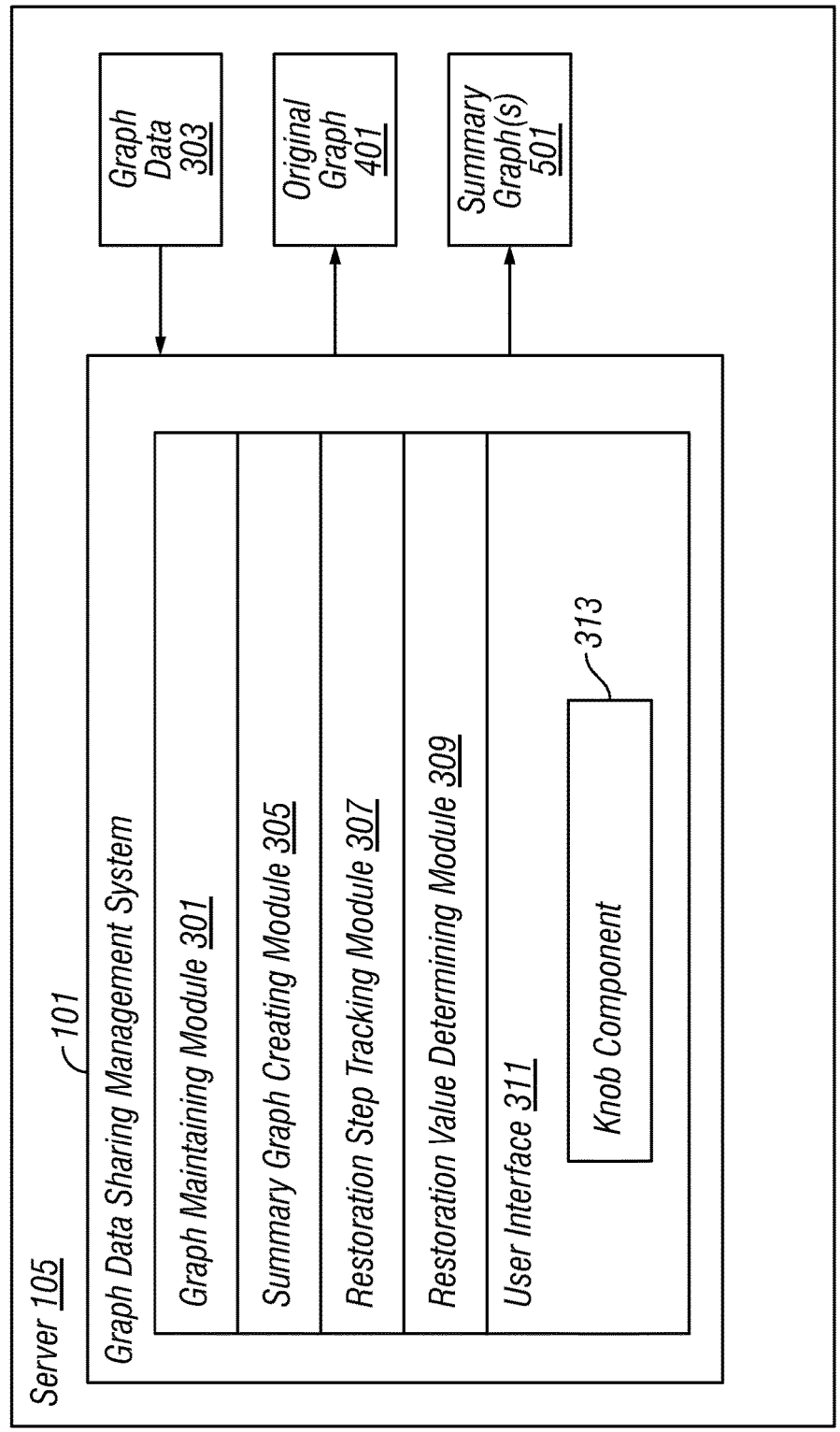
FIG. 3 is a high level block diagram of the operation of a graph data sharing management system, according to some embodiments.

FIG. 3 illustrates the operation of a graph data sharing management system 101 running on a server 105. As described above, the functionalities of the graph data sharing management system 101 can reside on specific computers 210 or be otherwise distributed between multiple computer systems 210, including within a fabric/cloud-based computing environment in which the functionality of the graph data sharing management system 101 is provided as a service over a network 107. It is to be understood that although the graph data sharing management system 101 is illustrated in FIG. 3 as a single entity, the illustrated graph data sharing management system 101 represents a collection of functionalities, which can be instantiated as a single or multiple modules as desired (instantiation of a specific, multiple module graph data sharing management system 101 is illustrated in FIG. 3). It is to be understood that the modules of the graph data sharing management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the graph data sharing management system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

The graph data sharing management system 101 enables an organization to present graph data 303 to receiving parties with specific targeted levels of confidential information hidden, while preserving utility of the graph data 303. An original graph 401 of a given data set can be summarized to varying levels of granularity by consolidating related units of data (nodes 403) into groups, and omitting relationships between combined nodes 403 in the resulting summary graphs 501. Because the underlying content of the nodes 403 remains in the summary graphs, the graph data 303 still has utility even as edges 405 are omitted. By restoring specific omitted edges 405, summary graphs 501 can be created with varying levels of utility and privacy protection, depending upon the trust level of the receiving party, or the price paid. A user interface component 313 such as a knob or slider can be operated by the graph provider to automatically create and provide summary graphs 501 at varying levels of granularity.

Figures 4, 5:
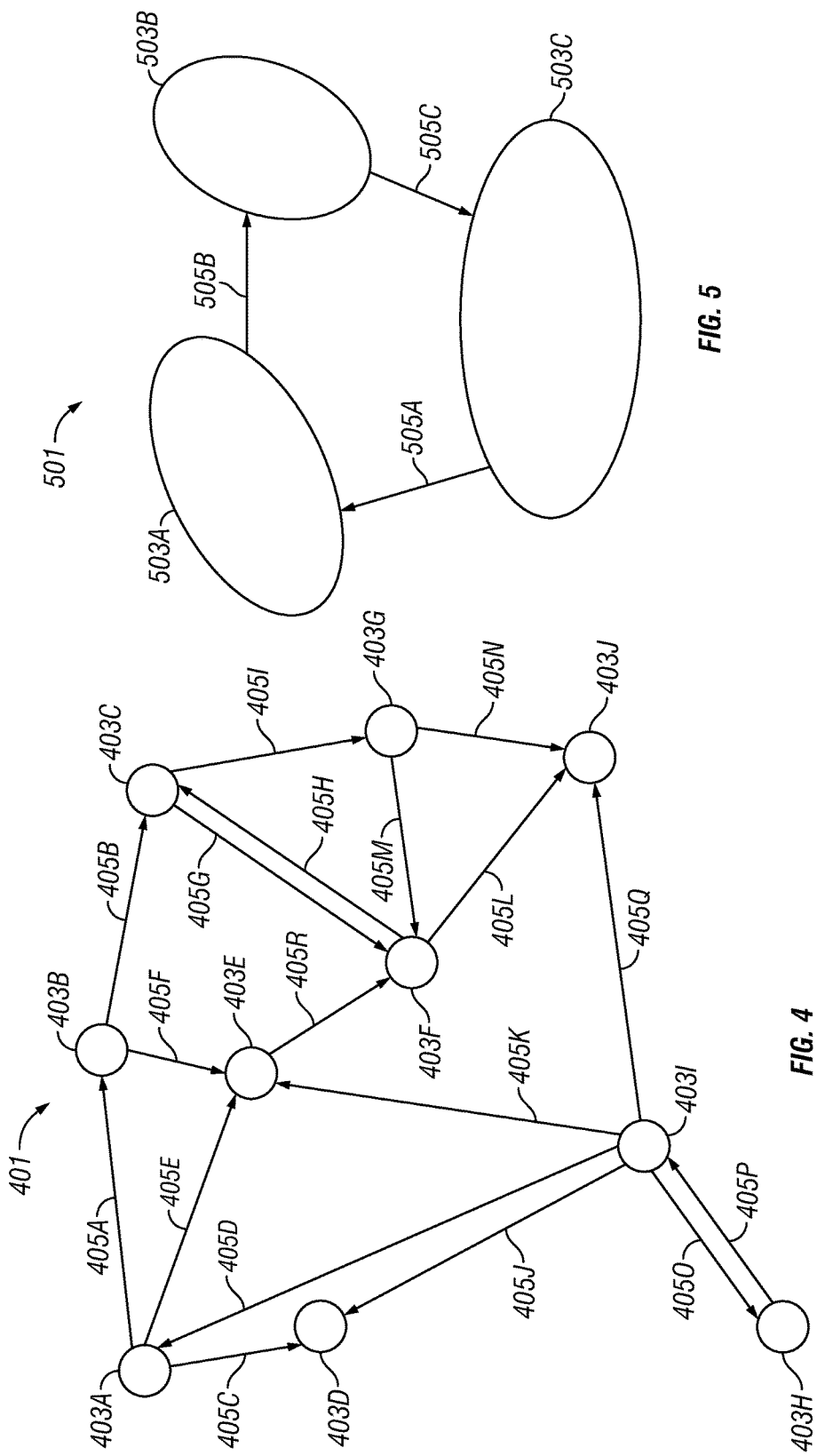
FIG. 4 is a diagram of an original graph, according to one embodiment.
FIG. 5 is a diagram of a summary graph, according to one embodiment.

As illustrated in FIG. 3, a graph maintaining module 301 of the graph data sharing management system 101 maintains an original graph 401 representing a data set (i.e., graph data 303). The original (or first) graph 401 has not yet been collapsed into a summary graph 501 that omits some of the confidential data. Turning our attention now to FIG. 4, an example original graph 401 is illustrated, which contains multiple nodes 403 and multiple edges 405. Each node 403 contains content and each edge 405 represents a relationship between a pair of nodes 405. A given node 403 can have multiple edges 405, expressing its relationship to multiple other nodes 403. It is to be understood that the specific graph data 303 represented by a given graph 403 can be in the form of any data possessed by an organization (e.g., an enterprise, university, government, etc.). Examples include data sets such as customer lists, intelligence concerning an industry or other target, information documenting the hierarchical structure of an enterprise or other organization, etc.

As explained above, whereas the nodes 403 contain content, the edges 405 express relationships between nodes 403. It is to be understood that the relationships between nodes 403 in graph data 303 typically contains confidential information. In other words, the relationships between units of data in the graph 403 are represented by edges 405, which themselves comprise confidential data, over and above whatever information is contained in the nodes 403 themselves. It is to be understood that although the example original graph 401 illustrated in FIG. 4 contains ten nodes 403 and eighteen edges 405 for purposes of explanation in the context of this example, original graphs 401 utilized within the context of the graph data sharing management system 101 are typically much larger, containing orders of magnitude more nodes 403 and edges 405 (e.g., hundreds, thousands, tens or hundreds of thousands, millions, etc.).

As noted above, the graph data sharing management system 101 enables providing the graph data 303 to target parties (e.g., other organizations, other departments within an organization, customers, etc.) at varying levels of summarization (i.e., with varying levels of confidential data hidden thus decreasing utility but increasing privacy protection). To do so, a summary graph creating module 305 of the graph data sharing management system 101 creates a summary graph 501 from the original graph 401. More specifically, the summary graph creating module 305 groups the nodes 403 of the original graph 401 into subsets. Various types of criteria that can be used for making such groupings are described in more detail below. Each node 403 of the original graph 401 is grouped into a particular subset, and the nodes 403 of each subset are combined into a so-called super-node 503. Once the nodes 403 of a given subset are combined, the resulting super-node 503 contains the content of each node 403 of the subset.

In addition to combining the nodes 403 of the original graph 401 into super-nodes 503, the edges 405 between nodes 403 of the original graph 401 are also combined into super-edges 505. A super-edge 505 represents a relationship between a pair of super-nodes 503. More specifically, for a given edge 405 of a given node 403 of the original graph 401, there are different possible scenarios. Once scenario is that the given edge 405 expresses a relationship between the given node 403 and another node 403 that is being combined into the same super-node 503 (i.e., the edge 405 is between two nodes 403 of the original graph 401 that have been grouped into the same subset). In this scenario, the edge 405 is eliminated because the content of each of the corresponding pair of nodes 403 is now in a single super-node 503.

Another scenario is that the given edge 405 expresses a relationship between the given node 403 and a second node 403 that is being assigned to a different super-node 503. In this case, the edge 403 is replaced with a super-edge 505 expressing the relationship between the two super-nodes 503. For example, suppose the edge 405 points from the first node 403 to the second node 403, in a situation in which the two nodes 403 are grouped into a first and a second super-node 503 respectively. The resulting super-edge 505 would thus point from the first super-node 503 to the second super-node 503. It is to be understood that multiple edges 405 of the original graph can be combined into a single super-edge 505. This occurs when multiple nodes 403 being combined into a given super-node 503 point to one or more nodes 403 being grouped into another given super-node 503 (or vice versa). For example, suppose eight different nodes 403 being combined into a first super-node 503 have edges 405 pointing to three different nodes 403 being combined into a second super-node 503. In this case, these eight separate edges 405 would be combined into a single super-edge 505 pointing from the first super-node 503 to the second super-node 503.

The resulting super-nodes 503 and super-edges 505 make up the summary (or second) graph 501. An example summary graph is illustrated in FIG. 5, which is discussed in more detail below. It is to be understood that the summary graph 501 contains all of content contained in the nodes 403 of the original graph 401, because each super-node 503 contains the separate content of each separate node 403 it absorbed. However, some of the relationships within the graph data 303 expressed in the original graph 401 are omitted from the summary graph 501. This can occur several ways. One way is when two nodes 403 of the original graph 401 with an edge 405 between them are combined into the same super-node 503. In this case, the relationship between these two nodes 403 expressed by the edge 405 is not exposed in the summary graph 501, because the two nodes 403 have been combined into a single super-node 503, and the edge 403 has been eliminated. Another way in which the summary graph 501 omits relationships between nodes 403 of the original graph 401 is by combing multiple edges 405 of the original graph into a single super-edge 505 between two super-nodes 503 of the summary graph 501, as described above. In other words, although the super-edge 505 expresses a relationship between two super-nodes 503, any given super-edge 505 can be, in effect, a summary of multiple relationships between multiple nodes 401 in the original graph 401. Put another way, when more than one node 403 combined into a single super-node 503 points to one (or more) node(s) 403 combined into a separate super-node 503, all of these underlying edges 405 from the original graph 401 are combined into a single super-edge 505 in the summary graph 501. Because relationships (i.e., edges) between units of data express useful information about the underlying graph data 303, a summary graph 501 containing fewer super-edges 505 than there were underlying edges 405 in the original graph 401 is less useful. On the other hand, because at least some of the omitted relationships comprise confidential information, the resulting summary graph 501 also better protects privacy than the underlying original graph 401.

As noted above, in order to combine nodes 403 of the original graph 401 into super-nodes 503 of the summary graph 501, the nodes 403 of the original graph 401 are grouped into subsets. Different criteria can be used for making such groupings in different embodiments as desired. In one embodiment, nodes 403 are combined based on logical proximity. For example, suppose an original graph 401 has 10,000 nodes 403, and it is desired to create a summary graph 501 with one third as many super-nodes 503. To do so, the 10,000 nodes 403 of the original graph could be organized into 3,333 groups of three (the one node 403 left over can be added to one of the groups as desired). In a straight logical proximity embodiment, the edges 405 between the nodes 403 are all considered to have the same connectedness value, and subsets of three nodes 403 are grouped based on the density of the edges 403 between them. In other words, groups of nodes 403 with the most connections between them in the original graph 401 are identified, and organized into subsets of the desired size. Each subset is then combined into a super-node 503 as described above. The target size of the summary graph 501 relative to the original graph 401 is a variable design parameter depending upon the level of summarization desired. As described in detail below, graphs can be summarized recursively in steps to create multiple levels of summarization.

In different embodiments, other criteria can be used for grouping nodes 403 into subsets. For example, nodes 403 and/or edges 405 can be weighted according to factors such as confidentiality, utility, importance, etc. Nodes 403 can then be combined based on their weights and/or the weights of their edges 405. The specific format of the weighting is a variable design parameter. Typically, the weighting criteria (e.g., confidentiality) of the data contained in nodes 403 or edges 405 is quantified on a scale. Nodes 403 can then be combined according to their corresponding weights according to different criteria. For example, in one embodiment the nodes 403 of the original graph 401 are organized such that each subset has a similar average weight based on the weights of its members. Another example would be grouping nodes 403 with similar weights into subsets. Many other variations are possible. In some embodiments instead of or in addition to weights, nodes 403 can be classified according to type, subject, content, etc., and grouped according to these criteria. Any desired level of granularity can be used when weighting, classifying and/or grouping nodes 403. It is to be understood that the subsets of nodes 403 that are combined into super-nodes 503 need not be the same size, i.e., subsets can contain different numbers of nodes 403 as desired.

As explained above, when the edges 403 of the original graph are combined into super-edges 505, graph data 303 from the original graph 401 is lost in the resulting summary graph 501. As nodes 403 are combined into super-nodes 503 and edges 405 are combined into super-edges 505, a restoration step tracking module 307 of the graph data sharing management system 101 tracks restoration steps that would have to be made to restore graph data 303 omitted from the summary graph 501. For each edge 403 not present in the summary graph 501, specific graph data 303 is lost (i.e., the relationship between nodes expressed by the omitted edge 403). To restore the lost graph data 303 represented by a specific edge 403 to the summary graph 501, a serious of restoration steps would be required. More specifically, the edge 405 from the original graph 401 expresses a relationship between a pair of nodes 403 from the original graph 401. To express that relationship graphically, both nodes 403 of the pair would need to be extracted from the super-node (s) 503 into which they were combined, and the edge 403 between them restored. The restoration step tracking module 307 tracks such steps when each given edge 405 is eliminated during the creation of the summary graph 501. The steps associated with restoration of any specific edge 403 can then be executed to restore the graph data 303 omitted from the summary graph 501 by the elimination of the specific edge 405. Although performing the tracked restoration steps for each edge 405 would restore the state of the original graph 401, omitted graph data 303 can be restored piecemeal, by performing tracked restoration steps associated with one or more specific edges 405, but not for all of the edges 405 of the original graph 401 that were omitted from the summary graph 501. Thus, varying amounts of omitted graph data 303 can be re-exposed as desired. In other words, each tracked restoration reveals certain graph data 303 as represented by the restored edge 403. Thus, by applying specific ones of the restorations to the summary graph 501, graph data 303 can be selectively restored as desired. Selectively restoring graph data 303 is discussed in detail below.

As noted above, the summary graph creating module 305 can create multiple levels of summary graphs 501, by making multiple passes of the graph consolidation functionality described above (e.g., recursively). For example, an original graph 401 of, for example, one million nodes 403 could be consolidated into a first generation summary graph $501_{FIRST}$ of, for example, 250,000 first generation super-nodes $503_{FIRST}$. The super-nodes $503_{FIRST}$ and super-edges $505_{FIRST}$ of the first generation summary graph $501_{FIRST}$ could then be consolidated into a second generation summary graph $501_{SECOND}$ of, e.g., 62,500 second generation super-nodes $503_{SECOND}$. Thus process can be repeated for any desired value of N passes. It is to be understood that the graph sizes and consolidation ratios above are examples, and other values can be used in other embodiments. As multiple recursive passes of graph summarization are made, the restoration tracking module 307 continues to track and maintain the sets of steps for restoring omitted graph data 303 represented by edges eliminated during the different generations of graph consolidation.

Regardless of whether the original graph 401 is consolidated in one or multiple passes, in some embodiments a restoration value determining module 309 of the graph data sharing management system 101 quantifies each tracked restoration, according to various criteria such as confidentiality, utility or importance of the graph data 303 represented by the corresponding edge. In other words, a quantified value is determined for the value of the graph data 303 that would be restored if the restoration were made. In some embodiments the quantifications are based on corresponding weights of the associated edges and/or nodes. In other embodiments, other factors are taken into account, such as administrator entered input. The quantified restorations can be valued using a discrete power law probability distribution such as Zipf's law. In other embodiments, other statistical methodologies or functionality can be used to price the restorations.

Using the quantified restorations (which can be sorted or otherwise ordered), customized summary graphs 501 can be provided to different target parties (e.g., customers, outside organizations, other departments within an organization) with varying levels of graph data 303 exposed and omitted. Note that the values of restorations can be in money (or corresponding goods or services or the like). In this scenario, a party can purchase a version of a summary graph 501. The more graph data 303 the purchaser wishes to have exposed, the higher the price. The lowest price would be for the summary graph 501 with no restorations made (i.e., no omitted graph data 303 restored). As more restorations are made, the price increases accordingly, with each restoration having a specific price as explained above. The most expensive version of the graph is the original form 401, with no graph data 303 omitted. Graph providers need not make all restorations available for purchase. Which restorations are made available to target parties and which (if any) are not are variable design parameters.

The value of restorations can be in formats other than monetary. For example, each restoration can be quantified with a given trust value signifying the confidentiality of the corresponding edge. Graph data 303 can be exposed to different parties depending upon their corresponding trust rating. For example, a graph could be shared between different departments within a single organization according to the trust rating of the receiving department, with the rating acting as a threshold for whether the department can see a graph with restorations quantified at given trust values.

Using this functionality, an organization can expose its graph data 303 to receiving parties at any level of granularity, as determined by, for example, the status (e.g., trust ranking) or price paid (e.g., in dollars) of the receiving party.

In some embodiments, the graph data sharing management system 101 provides a user interface 311, for example a dashboard or console exposed to an administrator or the like. The user interface 311 can include a graphical component 313 such as a knob or slider to automatically create and provide summary graphs 501 at varying levels of granularity. The administrator can adjust the level of fidelity to provide in a summary graph 501 by operating the component 313 (e.g., adjusting the knob in one direction or the other). An organization can thus share graph data 303 at varying, automatically adjustable levels of usability and privacy protection, according to, for example, the monetary incentive received or the level of trust placed in the receiving party.

An example of the creation of a summary graph 501 from an original graph 401 is now provided. FIG. 4 illustrates a specific example of an original graph 401, containing ten nodes (illustrated as circles) 403A-403J. The ten nodes 403 of FIG. 4 are connected by eighteen edges (illustrated as arrows) 405A-405R. These edges 405 represent directional relationships between the nodes 403. More specifically, node 403A points to nodes 403B and 403D and 403E, as illustrated by edges 405A, 405C and 405E respectively. Node 403B points to nodes 403C and 403E (edges 405B and 405F). Node 403C points to node 403F (edge 405G) and node 403G (edge 405I). The rest of the relationships between the nodes 403 of original graph 401 are illustrated by the remaining edges 405 in FIG. 4.

In the example illustrated in FIGS. 4 and 5, in order to create summary graph 501 from original graph 401, the nodes 403 of graph 401 are grouped into three subsets as follows: nodes 403A, 403B, 403D and 403E are grouped into a first subset, which becomes super-node 503A of summary graph 501. Nodes 403C, 403F and 403G are grouped into a second subset, which becomes super-node 503B. Lastly, nodes 403H, I and J are grouped into a third subset, which becomes super-node 503C of summary graph 501. Note that the specific grouping described herein is just an example, as are the number of nodes 403 in original graph 401 and the number of subsets into which they are grouped (and hence the number of super-nodes 503 of summary graph 501).

The edges 405 of the nodes 403 that are combined to create super-nodes 503A, B and C, are replaced by super-edges 505A, B and C. More specifically, for super-node 503A, edges 405A, 405C, 405E and 405F are omitted outright, because each of these edges 405 expresses a relationship between a pair of nodes 403 both of which are combined into super-node 503A. For the nodes 403 combined into super-node 503A, this leaves edges 405B and 405R. In original graph 401, edge 405B points from node 403B which is combined into super-node 503A to node 403C, which is combined into super-node 503B. Edge 405R points from node 403E which is combined into super-node 503A to node 403F, which is combined into super-node 503B. Thus, even though edges 405B and R represent two separate relationships between different pairs of nodes 403 of original graph 401, both are replaced with super-edge 505B, pointing from super-node 503A (into which both nodes 403B and E are combined) to super-node 503B (into which both nodes 403C and F are combined).

Turning to super-node 503B, underlying edges 405G, H, I and M are omitted because they each represent a relationship between nodes 403 combined into super-node 503B. Edges 405L (pointing from node 403F to 403J) and edge 403N (pointing from node 403G to 403J) are replaced by super-edge 505C, which points from super-node 503B to super-node 503C.

Concerning super-node 503C, internal edges 405O, P and Q are omitted, whereas edges 505J, D and K (all pointing from node 403I to nodes 403D, 403A and 403E respectively) are replaced by super-edge 505A, which points from super-node 503C to super-node 503A.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for maintaining graphs for sharing confidential data using multiple levels of summarization with varying data utility and privacy protection, the method comprising:
    maintaining, by a computer, a first graph comprising a plurality of nodes and a plurality of edges, each node comprising content and each edge representing a relationship between a pair of nodes, at least some of the edges representing confidential data;
    creating, by the computer, a second graph from the first graph, the creating of the second graph from the first graph comprising at least: grouping the nodes of the first graph into a plurality of subsets; for each specific grouped subset of nodes, combining each node of the specific subset into a super-node comprising content of each node of the specific subset; and, for each specific super-node, combining at least one edge of each node that was combined into the specific super-node into at least one super-edge, wherein each super-edge represents a relationship between the specific super-node and another super-node;
    maintaining the second graph, the nodes of the second graph comprising the created super-nodes and the edges of the second graph comprising the created super-edges, at least one edge of the first graph being omitted from the second graph, and the second graph lacking confidential data represented by the at least one omitted edge of the first graph;
    tracking, by the computer, steps for restoring each edge of the first graph omitted from the second graph; and
    providing, by the computer, the second graph to at least one party.

2. The method of claim 1 further comprising:
    determining a quantified value for restoration of each omitted edge of the first graph.

3. The method of claim 1 further comprising:
    providing the second graph to the at least one party responsive to the at least one party meeting a given threshold.

4. The method of claim 1 further comprising:
    creating, by the computer, a third graph from the second graph, the creating of the third graph from the second graph comprising at least: grouping the nodes of the second graph into a plurality of subsets; for each specific grouped subset of nodes, combining each node of the specific subset into a super-node comprising content of each node of the specific subset; and, for each specific super-node, combining at least one edge of each node that was combined into the specific super-node into at least one super-edge, wherein each super-edge represents a relationship between the specific super-node and another super-node;
    maintaining the third graph, the nodes of the third graph comprising the created super-nodes and the edges of the third graph comprising the created super-edges, at least one edge of the second graph being omitted from the third graph, and the third graph lacking confidential data represented by the at least one omitted edge of the second graph;
    tracking, by the computer, steps for restoring each edge of the second graph omitted from the third graph; and
    providing the third graph to at least one specific party meeting a specific threshold.

5. The method of claim 1 wherein combining at least one edge of each node that was combined into the specific super-node with at least one super-edge further comprises:
    eliminating at least one edge that expresses a relationship between two nodes of the first graph that are being combined into a single super-node.

6. The method of claim 1 wherein combining at least one edge of each node that was combined into the specific super-node with at least one super-edge further comprises:
    replacing at least one edge that expresses a relationship between a first node being combined into a first super-node and a second node being combined into a second super-node with a super-edge expressing a relationship between the first super-node and the second super-node.

7. The method of claim 1 wherein combining at least one edge of each node that was combined into the specific super-node with at least one super-edge further comprises:
    replacing multiple edges that express separate relationships between at least one node being combined into a first super-node and at least one node being combined into a second super-node with a single super-edge expressing a relationship between the first super-node and the second super-node.

8. The method of claim 1 wherein grouping the nodes of the first graph into a plurality of subsets further comprises:
    grouping nodes into specific subsets based on logical proximity.

9. The method of claim 1 wherein grouping the nodes of the first graph into a plurality of subsets further comprises:
    weighting nodes according to confidentiality and/or utility of their content; and
    grouping nodes into specific subsets based on their weights.

10. The method of claim 1 wherein grouping the nodes of the first graph into a plurality of subsets further comprises:
    weighting edges between nodes according to confidentiality and/or utility of relationships represented by the edges; and
    grouping nodes into specific subsets based on weights of their edges.

11. The method of claim 1 further comprising:
    creating a plurality of successive summary graphs from a plurality of predecessor graphs, the first graph comprising a first predecessor graph and the second graph comprising a first summary graph, the creating of the each specific successive summary graph from its specific predecessor graph comprising at least: grouping the nodes of the specific predecessor graph into a plurality of subsets; for each specific grouped subset of nodes, combining each node of the specific subset into a super-node comprising content of each node of the specific subset; and, for each specific super-node, combining at least one edge of each node that was combined into the specific super-node into at least one super-edge, wherein each super-edge represents a relationship between the specific super-node and another super-node; wherein the nodes of the specific successive summary graph comprise the created super-nodes and the edges of the specific successive summary graph comprise the created super-edges, at least one edge of the specific predecessor graph being omitted from the specific successive summary graph, and the specific successive summary graph lacking confidential data represented by the at least one omitted edge of the specific predecessor graph; and tracking steps for restoring each omitted edge of each predecessor graph.

12. The method of claim 11 wherein tracking steps for restoring each omitted edge of each predecessor graph further comprises:
as multiple recursive passes of graph summarization are made, tracking and maintaining sets of steps for restoring omitted graph data represented by edges eliminated during multiple generations of graph consolidation.

13. The method of claim 11 further comprising:
determining a quantified value for restoration of each omitted edge of each predecessor graph.

14. The method of claim 11 further comprising:
determining a quantified monetary value for restoration of each omitted edge of each predecessor graph;
receiving a specific monetary value from a specific party;
creating a custom summary graph by making restorations of omitted edges corresponding to the received monetary value; and
providing the custom summary graph to the specific party.

15. The method of claim 11 further comprising:
determining a quantified trust level for restoration of each omitted edge of each predecessor graph;
creating a custom summary graph by making restorations of omitted edges corresponding to a trust level of a specific party; and
providing the custom summary graph to the specific party.

16. At least one non-transitory computer readable medium for maintaining graphs for sharing confidential data using multiple levels of summarization with varying data utility and privacy protection, the at least one non-transitory computer readable medium storing computer executable instructions that, when loaded into computer memory and executed by at least one processor of at least one computing device, cause the at least one computing device to perform the following steps:
maintaining a first graph comprising a plurality of nodes and a plurality of edges, each node comprising content and each edge representing a relationship between a pair of nodes, at least some of the edges representing confidential data;
creating a second graph from the first graph, the creating of the second graph from the first graph comprising at least: grouping the nodes of the first graph into a plurality of subsets; for each specific grouped subset of nodes, combining each node of the specific subset into a super-node comprising content of each node of the specific subset; and, for each specific super-node, combining at least one edge of each node that was combined into the specific super-node into at least one super-edge, wherein each super-edge represents a relationship between the specific super-node and another super-node;
maintaining the second graph, the nodes of the second graph comprising the created super-nodes and the edges of the second graph comprising the created super-edges, at least one edge of the first graph being omitted from the second graph, and the second graph lacking confidential data represented by the at least one omitted edge of the first graph;
tracking steps for restoring each edge of the first graph omitted from the second graph; and
providing the second graph to at least one party.

17. The at least one non-transitory computer readable medium of claim 16 further storing computer executable instructions for:
creating a plurality of successive summary graphs from a plurality of predecessor graphs, the first graph comprising a first predecessor graph and the second graph comprising a first summary graph, the creating of the each specific successive summary graph from its specific predecessor graph comprising at least: grouping the nodes of the specific predecessor graph into a plurality of subsets; for each specific grouped subset of nodes, combining each node of the specific subset into a super-node comprising content of each node of the specific subset; and, for each specific super-node, combining at least one edge of each node that was combined into the specific super-node into at least one super-edge, wherein each super-edge represents a relationship between the specific super-node and another super-node;
wherein the nodes of the specific successive summary graph comprise the created super-nodes and the edges of the specific successive summary graph comprise the created super-edges, at least one edge of the specific predecessor graph being omitted from the specific successive summary graph, and the specific successive summary graph lacking confidential data represented by the at least one omitted edge of the specific predecessor graph;
tracking steps for restoring each omitted edge of each predecessor graph; and
providing the second graph to at least one party.

18. The at least one non-transitory computer readable medium of claim 17 further storing computer executable instructions for:
determining a quantified monetary value for restoration of each omitted edge of each predecessor graph;
receiving a specific monetary value from a specific party;
creating a custom summary graph by making restorations of omitted edges corresponding to the received monetary value; and
providing the custom summary graph to the specific party.

19. The at least one non-transitory computer readable medium of claim 17 further storing computer executable instructions for:
determining a quantified trust level for restoration of each omitted edge of each predecessor graph;
creating a custom summary graph by making restorations of omitted edges corresponding to a trust level of a specific party; and
providing the custom summary graph to the specific party.

20. A computer system for detecting electronic messaging threats by using metric trees and similarity hashes, the computer system comprising:

a processor;

system memory;

a graph maintaining module residing in the system memory, the graph maintaining module being programmed to maintain a first graph comprising a plurality of nodes and a plurality of edges, each node comprising content and each edge representing a relationship between a pair of nodes, at least some of the edges representing confidential data;

a summary graph creating module residing in the system memory, the summary graph creating module being programmed to create a second graph from the first graph, the creating of the second graph from the first graph comprising at least: grouping the nodes of the first graph into a plurality of subsets; for each specific grouped subset of nodes, combining each node of the specific subset into a super-node comprising content of each node of the specific subset; and, for each specific super-node, combining at least one edge of each node that was combined into the specific super-node with at least one super-edge, wherein each super-edge represents a relationship between the specific super-node and another super-node;

the graph maintaining module being further programmed to maintain the second graph, the nodes of the second graph comprising the created super-nodes and the edges of the second graph comprising the created super-edges, at least one edge of the first graph being omitted from the second graph, and the second graph lacking confidential data represented by the at least one omitted edge of the first graph;

a restoration step tracking module residing in the system memory, the restoration step tracking module being programmed to track steps for restoring each edge of the first graph omitted from the second graph; and a user interface programmed to provide the second graph to at least one party.

\* \* \* \* \*